United States Patent
Katagiri

(10) Patent No.: US 11,198,785 B2
(45) Date of Patent: Dec. 14, 2021

(54) POLYCARBONATE RESIN COMPOSITION

(71) Applicant: Mitsubishi Engineering-Plastics Corporation, Minato-ku (JP)

(72) Inventor: Hiroo Katagiri, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 36 days.

(21) Appl. No.: 16/627,907

(22) PCT Filed: Sep. 28, 2018

(86) PCT No.: PCT/JP2018/036223
§ 371 (c)(1),
(2) Date: Dec. 31, 2019

(87) PCT Pub. No.: WO2019/073818
PCT Pub. Date: Apr. 18, 2019

(65) Prior Publication Data
US 2021/0095117 A1    Apr. 1, 2021

(30) Foreign Application Priority Data

Oct. 13, 2017   (JP) .............................. JP2017-199058
Jul. 10, 2018   (JP) .............................. JP2018-130764

(51) Int. Cl.
*C08L 69/00*    (2006.01)
*C08K 7/14*    (2006.01)
*C08K 3/40*    (2006.01)
*C08L 25/12*    (2006.01)

(52) U.S. Cl.
CPC ................ *C08L 69/00* (2013.01); *C08K 3/40* (2013.01); *C08K 7/14* (2013.01); *C08L 25/12* (2013.01)

(58) Field of Classification Search
None
See application file for complete search history.

(56) References Cited

U.S. PATENT DOCUMENTS

| | | | |
|---|---|---|---|
| 5,961,915 A | 10/1999 | Toyouchi et al. | |
| 2015/0025180 A1 | 1/2015 | Monden | |
| 2020/0055770 A1* | 2/2020 | Kato | ................ C08L 101/00 |

FOREIGN PATENT DOCUMENTS

| | | | |
|---|---|---|---|
| JP | 2002-206053 A | | 7/2002 |
| JP | 2004189806 | * | 7/2004 |
| JP | 2008-141130 A | | 6/2008 |
| JP | 2010015091 | * | 1/2010 |
| JP | 2010-275345 A | | 12/2010 |
| JP | 5021918 B2 | | 9/2012 |
| JP | 2012207075 | * | 10/2012 |
| JP | 2014-55255 A | | 3/2014 |
| WO | WO 95/27603 A1 | | 10/1995 |
| WO | WO 2013/115151 A1 | | 8/2013 |

OTHER PUBLICATIONS

International Search Report dated Dec. 4, 2018 in PCT/JP2018/036223 filed on Sep. 28, 2018, 1 page.

* cited by examiner

*Primary Examiner* — David J Buttner
(74) *Attorney, Agent, or Firm* — Oblon, McClelland, Maier & Neustadt, L.L.P.

(57) ABSTRACT

A polycarbonate resin composition which has high rigidity, excellent dimensional stability, and low linear expansion properties. The polycarbonate resin composition contains, relative to 100 parts by mass of a polycarbonate resin (A), 10 to 100 parts by mass of an acrylonitrile-styrenic copolymer (B), 10 to 100 parts by mass of glass flakes (C) having an average thickness of 0.45 to 1 μm, and 5 to 50 parts by mass of glass fibers (D) having an elliptical cross section with an ellipticity of more than 1.5 and not more than 8, wherein the mass ratio (D)/(C) of the content of the glass fibers (D) having an elliptical cross section to the content of the glass flakes (C) is 0.1 to 1.

20 Claims, No Drawings

POLYCARBONATE RESIN COMPOSITION

CROSS-REFERENCE TO RELATED APPLICATIONS

The present application is the national stage of international application PCT/JP2018/036223, filed on Sep. 28, 2018, and claims the benefit of the filing dates of Japanese Appl. No. 2017-199058 and 2018-130764, respectively filed on Oct. 13, 2017, and Jul. 10, 2018.

TECHNICAL FIELD

The present invention relates to a polycarbonate resin composition, and more specifically relates to a polycarbonate resin composition that exhibits high rigidity, excellent dimensional stability and low linear expansion properties.

BACKGROUND ART

Polycarbonate resin exhibit excellent mechanical characteristics, are widely used as engineering plastics, and have come to be compounded with a variety of reinforcing agents and additives in order to exhibit improved properties, and especially physical properties, required for certain fields of use. In addition, fibrous reinforcing materials such as glass fibers are used in fields requiring high mechanical strength and rigidity. Although resin compositions obtained by compounding glass fibers with polycarbonate resin exhibit excellent rigidity, the resin compositions have the drawback of mold shrinkage factor anisotropy due to alignment of fibers.

In recent years, there has been a trend of using resins in tubular bodies for lens barrels (lens tube) in imaging and optical devices having lenses, such as cameras, in order to reduce weight and lower costs, and materials obtained by reinforcing polycarbonate resin with glass fibers are also used. In lens barrels, barrel materials require sufficient rigidity and high dimensional precision so that the optical axis of an optical system does not shift when a lens is focused or zoomed.

Dimensional precision is also improved by using glass fibers having a specific cross-sectional shape.

PTL 1 proposes an aromatic polycarbonate resin composition having improved mechanical strength and flame retardancy, which comprises a polycarbonate resin, glass fibers having a specific elliptical cross-sectional shape, and a phosphoric acid ester flame retardant. Examples in this document disclose polycarbonate resin compositions in which glass fibers having an elliptical cross section and glass flakes having a thickness of 5 μm are compounded at a specific quantity ratio, and which also contain a phosphoric acid ester flame retardant and polytetrafluoroethylene, but the anisotropy of these compositions cannot be said to be satisfactory, and because impact strength and heat resistance deteriorate due to plasticity of the polycarbonate resin as a result of a phosphorus flame retardant being used, impact strength, heat resistance and anisotropy are insufficient and not satisfactory.

In addition, because lens barrels are obtained by combining resin materials with metals such as aluminum or magnesium (or alloys), it is essential to prevent optical axis deviation caused by differences in thermal expansion in a broad range of usage environment temperatures, and resin materials need to have similar coefficients of linear expansion to these metals.

CITATION LIST

Patent Literature

[PTL 1] Japanese Patent No. 5021918

SUMMARY OF INVENTION

Technical Problem

In view of the circumstances mentioned above, a purpose (an object) of the present invention is to provide a polycarbonate resin composition which has high rigidity, excellent dimensional stability and a similar coefficient of linear expansion to that of a metal such as aluminum.

Solution to Problem

As a result of diligent research in order to solve this problem, the inventor of the present invention found that by blending a specific quantity of an AS resin with a polycarbonate resin and incorporating glass flakes having a specific thickness and glass fibers having an elliptical cross section with a specific ellipticity at a specific quantity ratio, it was possible to obtain a polycarbonate resin composition which is excellent in terms of strength, dimensional stability and low anisotropy, has a similar coefficient of linear expansion to that of a metal such as aluminum or magnesium, and further exhibits excellent fluidity.

The present invention relates to a polycarbonate resin composition including, relative to 100 parts by mass of a polycarbonate resin (A), 10 to 100 parts by mass of an acrylonitrile-styrenic copolymer (B), 10 to 100 parts by mass of glass flakes (C) having an average thickness of 0.45 to 1 μm, and 5 to 50 parts by mass of glass fibers (D) having an elliptical cross section with an ellipticity of more than 1.5 and not more than 8, wherein the mass ratio (D)/(C) of the content of the glass fibers (D) having an elliptical cross section to the content of the glass flakes (C) is 0.1 to 1.

In addition, in the polycarbonate resin composition of the present invention, the mass ratio (C)/(B) of the content of the glass flakes (C) to the content of the acrylonitrile-styrenic copolymer (B) is preferably more than 1.0 and less than 4.0.

In the polycarbonate resin composition of the present invention, the content of the glass flakes (C) is preferably more than 30 parts by mass and not more than 100 parts by mass relative to 100 parts by mass of the polycarbonate resin (A).

In the polycarbonate resin composition of the present invention, the content of the glass fibers (D) having an elliptical cross section is preferably more than 15 parts by mass and not more than 50 parts by mass relative to 100 parts by mass of the polycarbonate resin (A).

In the polycarbonate resin composition of the present invention, the mass ratio (D)/(C) of the content of the glass fibers (D) having an elliptical cross section to the content of the glass flakes (C) is preferably 0.5 to 1.

In the polycarbonate resin composition of the present invention, the mass ratio (C)/(B) of the content of the glass flakes (C) to the content of the acrylonitrile-styrenic copolymer (B) is preferably 1.5 to 3.5.

Preferably, the polycarbonate resin composition of the present invention contains either no or, if any, not more than 1 part by mass of phosphorus flame retardant relative to 100 parts by mass of the polycarbonate resin (A), and contains either no or, if any, not more than 1 part by mass of fluororesin having fibril-forming ability relative to 100 parts by mass of the polycarbonate resin W.

Preferably, the polycarbonate resin of the present invention has coefficients of linear expansion in a MD direction and in a TD direction, as measured on the basis of ISO 11359-2, of in a range of $21 \times 10^{-6}$/K to $28 \times 10^{-6}$/K, and a ratio of the coefficient of linear expansion in the MD to that in the TD of in a range of 0.9 to 1.1.

Advantageous Effects of Invention

The polycarbonate resin composition of the present invention is excellent in terms of strength, dimensional stability and low anisotropy, has a similar coefficient of linear expansion to that of a metal such as aluminum or magnesium, and further exhibits excellent fluidity.

DESCRIPTION OF EMBODIMENTS

The present invention will now be explained in detail through the use of embodiments, examples etc.

The range including the word "to" herein means that the upper and lower limits of the numerical values mentioned before and after the word "to" are included, unless otherwise specified.

Detailed explanations will now be given of the components that constitute the polycarbonate resin composition of the present invention.

[Polycarbonate Resin (A)]

A polycarbonate resin is a polymer having a carbonate bond-containing basic structure represented by the formula: —[—O—X—O—C(=O)—]—. In the formula, the X moiety generally denotes a hydrocarbon, but it is possible to use X moieties into which heteroatoms or heterobonds are introduced in order to impart a variety of characteristics.

Polycarbonate resins can be classified into aromatic polycarbonate resin, in which a carbon atom directly bonded to a carbonate bond is an aromatic carbon atom, and aliphatic polycarbonate resin, in which a carbon atom directly bonded to a carbonate bond is an aliphatic carbon atom. Of these, aromatic polycarbonate resin are preferred from perspectives such as heat resistance, mechanical properties and electrical properties.

These are not limited to specific types of polycarbonate resin, but examples thereof include polycarbonate polymers obtained by reacting a dihydroxy compound with a carbonate precursor. On such occasion, it is possible to react a polyhydroxy compound or the like in addition to a dihydroxy compound and carbonate precursor. It is also possible to use a method in which a cyclic ether is reacted with carbon dioxide as a carbonate precursor. The polycarbonate polymer may be a straight chain or branched chain polymer. The polycarbonate polymer may be a homopolymer comprising one type of repeating unit or a copolymer having two or more types of repeating unit. Here, copolymers may be selected from among a variety of copolymer forms, such as random copolymers and block copolymers. Such polycarbonate polymers generally serve as thermoplastic resins.

Among monomers that serve as raw materials for aromatic polycarbonate resin, examples of aromatic dihydroxy compounds include:

dihydroxybenzenes such as 1,2-dihydroxybenzene, 1,3-dihydroxybenzene (that is, resorcinol) and 1,4-dihydroxybenzene;

dihydroxybiphenyls such as 2,5-dihydroxybiphenyl, 2,2'-dihydroxybiphenyl and 4,4'-dihydroxybiphenyl;

dihydroxynaphthalenes such as 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene and 2,7-dihydroxynaphthalene;

dihydroxydiaryl ethers such as 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy) benzene and 1,3-bis(4-hydroxyphenoxy) benzene;

bis(hydroxyaryl)alkanes such as 2,2-bis(4-hydroxyphenyl)propane (that is, bisphenol A), 1,1-bis(4-hydroxyphenyl)propane, 2,2-bis(3-methyl-4-hydroxyphenyl)propane, 2,2-bis(3-methoxy-4-hydroxyphenyl)propane, 2-(4-hydroxyphenyl)-2-(3-methoxy-4-hydroxyphenyl)propane, 1,1-bis(3-tert-butyl-4-hydroxyphenyl)propane, 2,2-bis(3,5-dimethyl-4-hydroxyphenyl)propane, 2,2-bis(3-cyclohexyl-4-hydroxyphenyl)propane, 2-(4-hydroxyphenyl)-2-(3-cyclohexyl-4-hydroxyphenyl)propane, α,α'-bis(4-hydroxyphenyl)-1,4-diisopropylbenzene, 1,3-bis[2-(4-hydroxyphenyl)-2-propyl]benzene, bis(4-hydroxyphenyl)methane, bis(4-hydroxyphenyl)cyclohexylmethane, bis(4-hydroxyphenyl)phenylmethane, bis(4-hydroxyphenyl)(4-propenylphenyl)methane, bis(4-hydroxyphenyl)diphenylmethane, bis(4-hydroxyphenyl)naphthylmethane, 1,1-bis(4-hydroxyphenyl)ethane, 1,1-bis(4-hydroxyphenyl)-1-phenylethane, 1,1-bis(4-hydroxyphenyl)-1-naphthylethane, 1,1-bis(4-hydroxyphenyl)butane, 2,2-bis(4-hydroxyphenyl)butane, 2,2-bis(4-hydroxyphenyl)pentane, 1,1-bis(4-hydroxyphenyl)hexane, 2,2-bis(4-hydroxyphenyl)hexane, 1,1-bis(4-hydroxyphenyl)octane, 2,2-bis(4-hydroxyphenyl)octane, 4,4-bis(4-hydroxyphenyl)heptane, 2,2-bis(4-hydroxyphenyl)nonane, 1,1-bis(4-hydroxyphenyl)decane and 1,1-bis(4-hydroxyphenyl)dodecane;

bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,3-dimethylcyclohexane, 1,1-bis(4-hydroxyphenyl)-3,4-dimethylcyclohexane, 1,1-bis(4-hydroxyphenyl)-3,5-dimethylcyclohexane, 1,1-bis(4-hydroxyphenyl)-3,3,5-trimethylcyclohexane, 1,1-bis(4-hydroxy-3,5-dimethylphenyl)-3,3,5-trimethylcyclohexane, 1,1-bis(4-hydroxyphenyl)-3-propyl-5-methylcyclohexane, 1,1-bis(4-hydroxyphenyl)-3-tert-butyl-cyclohexane, 1,1-bis(4-hydroxyphenyl)-4-tert-butyl-cyclohexane, 1,1-bis(4-hydroxyphenyl)-3-phenylcyclohexane and 1,1-bis(4-hydroxyphenyl)-4-phenylcyclohexane;

cardo structure-containing bisphenols such as 9,9-bis(4-hydroxyphenyl)fluorene and 9,9-bis(4-hydroxy-3-methylphenyl)fluorene;

dihydroxydiaryl sulfides such as 4,4'-dihydroxydiphenyl sulfide and 4,4'-dihydroxy-3,3'-dimethyldiphenyl sulfide;

dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone.

Of these, bis(hydroxyaryl)alkanes are preferred, and of these, bis(4-hydroxyphenyl)alkanes are preferred and 2,2-bis(4-hydroxyphenyl)propane (that is, bisphenol A) is particularly preferred from the perspectives of impact resistance and heat resistance.

One aromatic dihydroxy compound may be used, or two or more aromatic dihydroxy compounds combined in any combination and in any proportions may be used.

Examples of monomers that serve as raw materials for aliphatic polycarbonate resin include:

alkane diols such as ethane-1,2-diol, propane-1,2-diol, propane-1,3-diol, 2,2-dimethylpropane-1,3-diol, 2-methyl-2-propylpropane-1,3-diol, butane-1,4-diol, pentane-1,5-diol, hexane-1,6-diol and decane-1,10-diol;

cycloalkane diols such as cyclopentane-1,2-diol, cyclohexane-1,2-diol, cyclohexane-1,4-diol, 1,4-cyclohexanedimethanol, 4-(2-hydroxyethyl)cyclohexanol and 2,2,4,4-tetramethyl-cyclobutane-1,3-diol;

glycols such as ethylene glycol, 2,2'-oxydiethanol (that is, diethylene glycol), triethylene glycol, propylene glycol and spiroglycol;

aralkyl diols such as 1,2-benzenedimethanol, 1,3-benzenedimethanol, 1,4-benzenedimethanol, 1,4-benzenediethanol, 1,3-bis(2-hydroxyethoxy)benzene, 1,4-bis(2-hydroxyethoxy)benzene, 2,3-bis(hydroxymethyl)naphthalene, 1,6-bis(hydroxyethoxy)naphthalene, 4,4'-biphenyldimethanol, 4,4'-biphenyldiethanol, 1,4-bis(2-hydroxyethoxy)biphenyl, bisphenol A bis(2-hydroxyethyl) ether and bisphenol S bis(2-hydroxyethyl) ether; and cyclic ethers such as 1,2-epoxyethane (that is, ethylene oxide), 1,2-epoxypropane (that is, propylene oxide), 1,2-epoxycyclopentane, 1,2-epoxycyclohexane, 1,4-epoxycyclohexane, 1-methyl-1,2-epoxycyclohexane, 2,3-epoxynorbornane and 1,3-epoxypropane.

Among monomers that serve as raw materials for polycarbonate resin, examples of polycarbonate precursors include carbonyl halides and carbonate esters. One carbonate precursor may be used, or two or more carbonate precursors combined in any combination and in any proportions may be used.

Specific examples of carbonyl halides include phosgene; and haloformates such as bischloroformates of dihydroxy compounds and monochloroformates of dihydroxy compounds.

Specific examples of carbonate esters include diaryl carbonates such as diphenyl carbonate and ditolyl carbonate; dialkyl carbonates such as dimethyl carbonate and diethyl carbonate; and carbonates of dihydroxy compounds, such as biscarbonates of dihydroxy compounds, monocarbonates of dihydroxy compounds and cyclic carbonates.

The method for producing the polycarbonate resin is not particularly limited, and an arbitrary method can be used. Examples thereof include interfacial polymerization methods, melt transesterification methods, the pyridine process, ring opening polymerization of cyclic carbonate compounds, and solid phase transesterification of prepolymers.

The molecular weight of the polycarbonate resin (A) is such that the viscosity average molecular weight (Mv) is preferably 16,000 to 50,000, more preferably 18,000 or more, and further preferably 20,000 or more, and is more preferably 45,000 or less, further preferably 40,000 or less, and particularly preferably 38,000 or less. A viscosity average molecular weight of less than 16,000 is not desirable because impact resistance of a molded article tends to deteriorate and there are concerns that cracking will occur, and a viscosity average molecular weight of more than 50,000 is not desirable because fluidity deteriorates and problems occur in terms of moldability.

It is possible to use a mixture of two or more types of polycarbonate resin having different viscosity average molecular weights as the polycarbonate resin (A), and in such cases, it is possible to mix a polycarbonate resin having a viscosity average molecular weight out of the preferred range mentioned above.

In the present invention, the viscosity average molecular weight [Mv] of the polycarbonate resin is a value obtained by determining the intrinsic viscosity [η] (units: dl/g) at 20° C. using a Ubbelohde type viscometer using methylene chloride as a solvent, and then calculating the viscosity average molecular weight from the Schnell viscosity equation, that is, $\eta = 1.23 \times 10^{-4} \, Mv^{0.83}$. The intrinsic viscosity [η] is a value obtained by measuring the specific viscosity [$\eta_{sp}$] at each solution concentration [C] (g/dl) and calculating the intrinsic viscosity from the following expression.

$$\eta = \lim_{c \to 0} \eta_{sp}/c \qquad \text{[Math. 1]}$$

The polycarbonate resin in the present invention may be a copolymer mainly constituted of the polycarbonate resin, for example, a copolymer of the polycarbonate resin with an oligomer or polymer having a siloxane structure in order to, for example, further increase flame retardancy and impact resistance; a copolymer of the polycarbonate resin with a monomer, oligomer or polymer having a phosphorus atom in order to further improve thermal oxidation stability and flame retardancy; a copolymer of the polycarbonate resin with a monomer, oligomer or polymer having a dihydroxyanthraquinone structure in order to improve thermal oxidation stability; a copolymer of the polycarbonate resin with an oligomer or polymer having an olefinic structure, such as polystyrene, in order to improve optical properties; and a copolymer of the polycarbonate resin with a polyester resin oligomer or polymer in order to improve chemical resistance.

In order to improve the appearance of a molded article or improve the fluidity, the polycarbonate resin may contain a polycarbonate oligomer. The viscosity average molecular weight (Mv) of this polycarbonate oligomer is generally 1500 or more, and preferably 2000 or more, and is generally 9500 or less, and preferably 9000 or less. Furthermore, it is preferable for the contained polycarbonate oligomer to account for 30 mass % or less of the polycarbonate resin (including the polycarbonate oligomer), more preferably 20 mass % or less, and particularly preferably 10 mass % or less.

The polycarbonate resin may use not only virgin raw materials, but also polycarbonate resin regenerated from used products (so-called material-recycled polycarbonate resin).

However, it is preferable for regenerated polycarbonate resin to account for 80 mass % or less, and more preferably 50 mass % or less, of the polycarbonate resin. Because regenerated polycarbonate resin are highly likely to have undergone deterioration such as thermal deterioration or age-related deterioration, in cases where such polycarbonate resin are used at quantities in excess of the range mentioned above, it is possible that the hue or mechanical properties will deteriorate.

[Acrylonitrile-Styrenic Copolymer (B)]

The polycarbonate resin composition of the present invention contains an acrylonitrile-styrenic copolymer (B). The acrylonitrile-styrenic copolymer (B) is a copolymer of acrylonitrile and a styrenic monomer, and may be a copolymer that further contains another copolymerizable monomer.

Examples of the styrenic monomer that constitutes the acrylonitrile-styrenic copolymer (B) include styrene, α-methylstyrene, p-methylstyrene, vinylxylene, ethylstyrene, dimethylstyrene, p-tert-butylstyrene, vinylnaphthalene, methoxystyrene, monobromostyrene, dibromostyrene, fluorostyrene and tribromostyrene, with styrene and α-methylstyrene being more preferred, and styrene being particularly preferred.

Examples of other copolymerizable monomers other than the styrenic monomer and acrylonitrile include (meth) acrylic acid ester monomers, maleimide monomers such as maleimide, N-methylmaleimide and N-phenylmaleimide, and α,β-unsaturated carboxylic acids and anhydrides thereof, such as acrylic acid, methacrylic acid, maleic acid, maleic anhydride, phthalic acid and itaconic acid.

Of these, (meth)acrylic acid ester monomers are preferred, examples of which include methyl (meth)acrylate, ethyl (meth)acrylate, propyl (meth)acrylate, isopropyl (meth)acrylate, butyl (meth)acrylate, amyl (meth)acrylate, hexyl (meth)acrylate, octyl (meth)acrylate, 2-ethylhexyl (meth)acrylate, cyclohexyl (meth)acrylate, dodecyl (meth) acrylate, octadecyl (meth)acrylate, phenyl (meth)acrylate and benzyl (meth)acrylate, with methyl methacrylate being particularly preferred.

The term (meth)acrylate includes both methacrylate and acrylate, and the term (meth)acrylic acid esters includes both methacrylic acid esters and acrylic acid esters.

The method for producing the acrylonitrile-styrenic copolymer (B) is not limited, and can be a publicly known method, such as bulk polymerization, emulsion polymerization, solution polymerization or suspension polymerization.

The content of acrylonitrile monomer in the acrylonitrile-styrenic copolymer (B) is preferably 5 to 50 mass %, and more preferably 8 to 45 mass %. The content of units derived from the styrenic monomer is preferably 50 to 95 mass %, and more preferably 55 to 92 mass %.

The melt volume rate (MVR) of the acrylonitrile-styrenic copolymer (B) is preferably 5 to 100 cm$^3$/10 min, and more preferably 10 to 80 cm$^3$/10 min, at a temperature of 220° C. and a load of 10 kg.

The mass average molecular weight (Mw) of the acrylonitrile-styrenic copolymer (B) is preferably 60,000 to 220,000, and more preferably 80,000 to 200,000.

The mass average molecular weight (Mw) of the acrylonitrile-styrenic copolymer (B) is measured using GPC (gel permeation chromatography) in the present invention.

Examples of the acrylonitrile-styrenic copolymer include acrylonitrile-styrene copolymer (AS resin) and acrylonitrile-styrene-acrylic rubber copolymer (ASA resin), but an acrylonitrile-styrene copolymer (AS resin) is particularly preferred.

The content of the acrylonitrile-styrenic copolymer (B) is 10 to 100 parts by mass relative to 100 parts by mass of the polycarbonate resin (A). If this content is less than 10 parts by mass, the melt viscosity of the resin decreases and moldability deteriorates, and if this content exceeds 100 parts by mass, heat resistance deteriorates and weld strength also deteriorates. The content of the acrylonitrile-styrenic copolymer (B) is preferably 12 parts by mass or more, and more preferably 13 parts by mass or more, and is preferably 80 parts by mass or less, more preferably 60 parts by mass or less, further preferably 50 parts by mass or less, yet more preferably 40 parts by mass or less, and particularly preferably 30 parts by mass or less.

[Glass Flakes (C)]

The polycarbonate resin composition of the present invention contains glass flakes, and glass flakes (C) having an average thickness of 0.45 to 1 μm are used.

The average thickness of the glass flakes (C) in the present invention is 0.4 to 1 μm, which is less than that of ordinary glass flakes, which have thicknesses of approximately 5 μm.

The average thickness of the glass flakes (C) is preferably 0.5 to 0.9 μm, more preferably 0.55 to 0.85 μm, and particularly preferably 0.6 to 0.8 μm. If the average thickness exceeds the upper limit of the range mentioned above, the elasticity of the polycarbonate resin composition tends to decrease, and if the average thickness is less than the lower limit of the range mentioned above, the glass flakes tend to break extremely easily and rigidity and impact resistance deteriorate. Therefore, an average thickness outside the above-mentioned range is undesirable.

The average thickness of the glass flakes is measured using the method described below. The thicknesses of 100 or more glass flakes are measured using a scanning electron microscope (SEM), and the average value of these thicknesses is determined. It is possible to observe the glass flakes per se with a scanning electron microscope, or fill the glass flakes in a resin, carry out molding, cut the obtained molded product and observe the cut cross section.

The average particle diameter (length) of the glass flakes (C) is preferably 5 to 1000 μm, more preferably 20 to 700 μm, and further preferably 50 to 200 μm. The average particle diameter is the length of the glass flakes, and is calculated as the median diameter in the weight average distribution.

From the perspective of improving mechanical strength, the glass flakes (C) are preferably surface treated with a publicly known surface treatment agent, such as a silane coupling agent, a methylhydrogensiloxane, a titanate coupling agent or an aluminate coupling agent. Furthermore, from the perspective of handling, the glass flakes are preferably granulated or bundled by means of a binder such as an acrylic resin, a urethane resin, an epoxy resin or an unsaturated polyester resin. However, the average particle diameter and thickness ranges mentioned above for the glass flakes do not apply to a granulated or bundled product obtained by means of such granulation or bundling. The glass composition of the glass flakes is not particularly limited, and a variety of glass compositions, such as A-glass, C-glass or E-glass, can be selected and used as appropriate.

The content of the glass flakes (C) is, relative to 100 parts by mass of the polycarbonate resin (A), 10 to 100 parts by mass, preferably 15 parts by mass or more, more preferably 20 parts by mass or more, further preferably 25 parts by mass or more, and particularly preferably more than 30 parts by mass, and is more preferably 90 parts by mass or less, further preferably 85 parts by mass or less, and particularly preferably 80 parts by mass or less.

[Glass Fibers (D) Having Elliptical Cross Section]

The polycarbonate resin composition of the present invention is characterized by containing glass fibers (D) having elliptical cross section, which have an ellipticity of 1.5 to 8, in combination with the thin glass flakes (C) mentioned above. By using such a combination of the glass fibers (D) having an elliptical cross section and the thin glass flakes (C), it is possible to obtain a polycarbonate resin composition which is excellent in terms of strength and low anisotropy and which has a similar coefficient of linear expansion to that of a metal such as aluminum or magnesium.

The ellipticity of the glass fibers (D) having an elliptical cross section is such that the average value of the ratio of the long axis (width) to short axis (thickness) in a cross section of the glass fibers in the fiber direction (width/thickness, hereinafter referred to as "ellipticity") is preferably 1.6 or more, more preferably 1.8 or more, and further preferably 2 or more, and is preferably 7 or less, more preferably 6 or less, and further preferably 5 or less.

The average value of the long axis (width) in a cross section of the glass fibers (D) having an elliptical cross section is preferably 10 to 50 μm, more preferably 12 to 40 μm, further preferably 15 to 35 μm, and particularly preferably 18 to 30 μm. The average value of the short axis (thickness) in a cross section of the glass fibers (D) having an elliptical cross section is preferably 3 to 20 μm, more preferably 4 to 15 μm, and further preferably 5 to 12 μm.

The number average fiber length of the glass fibers (D) having an elliptical cross section is preferably 0.5 to 20 mm, more preferably 1 to 15 mm, and further preferably 2 to 10 mm.

The ratio of the average fiber length to average fiber diameter (aspect ratio) of the glass fibers (D) having an elliptical cross section is preferably 2 to 120, more preferably 2.5 to 70, and further preferably 3 to 50. In cases where the ratio of the average fiber length to average fiber diameter (aspect ratio) of the glass fibers having an elliptical cross section is less than 2, mechanical strength tends to decrease, and in cases where the aspect ratio exceeds 120, warpage and anisotropy increase and molded article appearance tends to significantly deteriorate.

As the glass fibers (D) having an elliptical cross section, those normally used for thermoplastic resin can be used, A-glass, E-glass or an alkali-resistant glass composition containing a zirconia component can also be used. Of these, the glass fibers (D) having an elliptical cross section used in the present invention are preferably an alkali-free glass (E-glass) from the perspective of improving the thermal stability of the polycarbonate resin composition.

The glass fibers (D) having an elliptical cross section used in the present invention can be surface treated with a silane coupling agent such as an aminosilane or an epoxysilane from the perspective of improving adhesion to the polycarbonate resin.

The glass fibers (D) having an elliptical cross section are preferably used as chopped strands obtained by bundling these fibers into many bundles and then cutting to a prescribed length, and on such occasion, it is preferable to blend a sizing agent with the glass fibers having an elliptical cross section. By blending a sizing agent, it is possible to achieve good mechanical properties in addition to the advantage of increased production stability of the polycarbonate resin composition.

The sizing agent is not particularly limited, but examples thereof include urethane, epoxy and acrylic sizing agents.

The content of the glass fibers (D) having an elliptical cross section is 5 to 50 parts by mass relative to 100 parts by mass of the polycarbonate resin (A). If the content of the glass fibers (D) having an elliptical cross section is less than 5 parts by mass, elastic modulus and impact resistance are insufficient, and if this content exceeds 50 parts by mass, impact resistance and fluidity are insufficient. The content of the glass fibers (D) having an elliptical cross section is preferably 6 parts by mass or more, more preferably 7 parts by mass or more, further preferably 10 parts by mass or more, and particularly preferably more than 15 parts by mass, and is preferably 47 parts by mass or less, more preferably 45 parts by mass or less, further preferably 38 parts by mass or less, and particularly preferably 32 parts by mass or less.

[Content Ratio of Glass Fibers (D) Having Elliptical Cross Section/Glass Flakes (C)]

In the polycarbonate resin composition of the present invention, the mass ratio (D)/(C) of the content of the glass fibers (D) having an elliptical cross section to the content of the glass flakes (C) is 0.1 to 1. By making the amount of glass fibers (D) having elliptical cross section less than the amount of glass flakes (C), it is possible to obtain a polycarbonate resin composition which is excellent in terms of strength and low anisotropy, which has a similar coefficient of linear expansion to that of a metal such as aluminum or magnesium, and which exhibits excellent fluidity. The (D)/(C) ratio is preferably 0.25 or more, more preferably 0.4 or more, and particularly preferably 0.5 or more, and is preferably 0.8 or less, and more preferably 0.7 or less.

The total content of the glass flakes (C) and the glass fibers (D) having an elliptical cross section is, relative to 100 parts by mass of the polycarbonate resin (A), preferably 30 to 100 parts by mass, more preferably 35 parts by mass or more, further preferably 40 parts by mass or more, and particularly preferably 50 parts by mass or more, and is more preferably 100 parts by mass or less, further preferably 90 parts by mass or less, and particularly preferably 85 parts by mass or less.

[Content Ratio of Glass Flakes (C)/Acrylonitrile-Styrenic Copolymer (B)]

In the polycarbonate resin composition of the present invention, the mass ratio (C)/(B) of the content of the glass flakes (C) to the content of the acrylonitrile-styrenic copolymer (B) is preferably more than 1.0 and less than 4.0. By making the amount of the glass flakes (C) greater than the amount of the acrylonitrile-styrenic copolymer (B), it is possible to achieve high fluidity and reduce coefficient of linear expansion anisotropy. The (C)/(B) ratio is more preferably 1.5 to 3.5, and further preferably 1.8 to 3.2.

[Additives and the Like]

The polycarbonate resin composition of the present invention may contain additives in addition to those mentioned above, such as stabilizers, mold-release agents, flame retardants, fluorescent brightening agents, pigments, dyes, impact resistance-improving agents, anti-static agents, plasticizers and compatibilizers. One or two or more of these additives and other resins may be blended.

Examples of pigments and dyes include inorganic pigments, organic pigments and organic dyes, and carbon black is particularly preferred as an inorganic pigment.

In cases where carbon black is contained, the content thereof is, relative to 100 parts by mass of the polycarbonate resin (A), generally 0.001 parts by mass or more, preferably 0.005 parts by mass or more and more preferably 0.01 parts by mass or more, and is generally 5 parts by mass or less, preferably 4 parts by mass or less, more preferably 3 parts by mass or less, and further preferably 2 parts by mass or less.

However, the polycarbonate resin composition of the present invention preferably contains no phosphorus flame retardant. That is, the polycarbonate resin composition preferably contains either no or, if any, 1 part by mass or less, more preferably 0.7 parts by mass or less, and particularly preferably 0.5 parts by mass or less of phosphorus flame retardant, relative to 100 parts by mass of the polycarbonate resin (A). If a phosphorus flame retardant is contained at a quantity greater than the above-mentioned amount, the impact resistance and thermal stability of the polycarbonate resin composition of the present invention tends to deteriorate, which is not desirable.

In addition, it is preferable for the polycarbonate resin composition of the present invention to contain no fluororesin having fibril-forming ability, which is an anti-dripping agent. That is, the polycarbonate resin composition preferably contains either no or, if any, 1 part by mass or less, more preferably 0.7 parts by mass or less, and particularly preferably 0.5 parts by mass or less of fluororesin having fibril-forming ability, relative to 100 parts by mass of the polycarbonate resin (A). If a fluororesin having fibril-forming ability is contained at a quantity greater than the above-mentioned amount, the viscosity of the polycarbonate resin composition of the present invention increases and molding processing properties tend to deteriorate, which is not desirable.

The polycarbonate resin composition of the present invention can contain another polymer in addition to the polycarbonate resin (A) and the acrylonitrile-styrenic copolymer (B). Examples of other resins include thermoplastic polyester resins such as polyethylene terephthalate resin, polytrimethylene terephthalate and polybutylene terephthalate resin; polyolefin resins such as polyethylene resin and polypropylene resin; polyamide resin; polyimide resin; polyetherimide resin; polyphenylene ether resin; polyphenylene sulfide resin; and polysulfone resin. It is possible to incorporate one of these other resins or an arbitrary combination of two or more types thereof combined at arbitrary proportions.

However, in cases where a resin other than the polycarbonate resin (A) and the acrylonitrile-styrenic copolymer (B) is contained, the content thereof is preferably 20 parts by mass or less, more preferably 10 parts by mass or less, further preferably 5 parts by mass or less, and particularly preferably 3 parts by mass or less, relative to 100 parts by mass of the polycarbonate resin (A).

[Method for Producing Polycarbonate Resin Composition]

The method for producing the polycarbonate resin composition of the present invention is not limited, and publicly known methods for producing polycarbonate resin compositions can be widely used, an example of which is a method including preliminarily mixing the polycarbonate resin (A), the acrylonitrile-styrenic copolymer (B), the glass flakes (C), the glass fibers (D) having an elliptical cross section and other components to be blended as required in any of a variety of mixing machines, such as a tumbler or Henschel mixer, and then melt kneading using a mixer such as a Banbury mixer, a roller, a Brabender, a uniaxial kneading extruder, a biaxial kneading extruder, or a kneader. The temperature during the melt kneading is not particularly limited, but is generally within the range 260° C. to 320° C.

A variety of molded articles can be produced by molding pellets, which are obtained by pelletizing the polycarbonate resin composition of the present invention, using a variety of molding methods. It is also possible to obtain a molded article by directly molding the resin composition that has been melt kneaded in an extruder, without forming pellets.

The polycarbonate resin composition of the present invention has coefficients of linear expansion in a MD direction and in a TD direction, as measured on the basis of ISO 11359-2, of preferably in a range of $21 \times 10^{-6}$/K to $28 \times 10^{-6}$/K, and the ratio of the coefficient of linear expansion in the MD to that in the TD of in a range of 0.9 to 1.1. When the polycarbonate resin composition of the present invention has a coefficient of linear expansion within this preferred range, the coefficient of linear expansion of the resin compound is similar to that of a metal or its alloy such as aluminum or magnesium, or its alloy. Therefore, when a lens barrel or the like is produced by combining the polycarbonate resin composition with these metals, it is possible to prevent deviation from roundness, optical axis deviation, and the like, caused by differences in thermal expansion in a broad range of usage environment temperatures.

The ratio of the coefficient of linear expansion in the MD to that in the TD (MD/TD) is more preferably 0.92 or more, and further preferably 0.94 or more, and is more preferably 1.08 or less, and further preferably 1.06 or less.

A molded article obtained from the polycarbonate resin composition of the present invention is excellent in terms of strength and low anisotropy, and has a similar coefficient of linear expansion to that of a metal such as aluminum or magnesium. Therefore, preferred examples of applications thereof include housing components and lens barrels for cameras, telescopes, microscopes, projection exposure devices, optical measurement devices, and the like; housing components and mechanism components for smartphone cameras, vehicle cameras, drive recorders, surveillance cameras, drone-mounted small cameras, and the like; housings and mechanism components for vehicle sensors such as impact prevention sensors, rear monitor sensors, vehicle speed sensors, temperature sensors and crime prevention sensors; frame members and external panel members for motor vehicles, motorcycles, bicycles, wheelchairs, and the like; panel members and mechanism components for home televisions, computer displays, vehicle monitors, smartphones, head-mounted displays, and the like; housings and mechanism components for reading devices such as bar code readers and scanners; housings and mechanism components for air conditioners, air purifiers, compressors, and the like; housings and mechanism components for information apparatuses such as wired and wireless LAN routers, Wi-Fi receivers, Wi-Fi storage, USB memory, memory cards, card readers and data server storage devices; and production/processing equipment components and measurement equipment components for optical devices, semiconductor package substrates, semiconductor production equipment, and the like.

EXAMPLES

The present invention will now be explained in detail with reference to Examples. However, it should be understood that the present invention is not limited to the Examples given below.

The raw materials used in the Examples and Comparative Examples given below are as follows.

TABLE 1

| Component | Symbol | |
|---|---|---|
| Polycarbonate resin (A) | A | Aromatic polycarbonate resin produced by interfacial polymerization using bisphenol A as a starting material Viscosity average molecular weight (Mv): 22,000 |
| AS resin (B) | B | Available from Techno Polymer Co. Product name: Sanrex 290FFDN Styrene content: 76 mass % |
| Glass flakes | C | Glass flakes Available from Nippon Sheet Glass Company. Product name: MEG160 FY-M01 Thickness: 0.7 mm, length: 160 mm |

TABLE 1-continued

| Component | Symbol | |
|---|---|---|
| | CX | Glass flakes<br>Available from Nippon Sheet Glass Company.<br>Product name: REFG 101<br>Thickness: 5 mm, length 600 mm |
| Glass fibers | D | Glass fibers having elliptical cross section<br>Available from Nitto Boseki Co.<br>Product name: CSG 3PA-830<br>Thickness: 7 mm, width: 28 mm, ellipticity: 4<br>Cut length: 3 mm |
| | DX | Glass fibers having round cross section<br>Available from Nippon Electric Glass Co.<br>Product name: ECS03 T-187<br>Diameter: 13 mm, cut length: 3 mm<br>Ellipticity of fiber cross section: 1 to 1.1 |

Examples 1 to 12 and Comparative Examples 1 to 21

[Production of Resin Composition Pellets]

The polycarbonate resin (A) and AS resin (B) mentioned above were homogeneously mixed in a tumbler mixer, and then fed from a hopper to an extruder and melt kneaded. Glass flakes (C, CX) and glass fibers (D, DX) were each side fed at a downstream position at two thirds the length L of the barrel from the upstream of the extruder.

Using twin screw extruder TEX25αIII (L/D=52.5) from The Japan Steel Works as the extruder, melt extrusion was carried out at a screw rotation speed of 200 rpm, a cylinder temperature of 300° C. and a discharge rate of 25 kg/hr. After side feeding raw materials other than the glass flakes and glass fibers, melt kneading was carried out for 15 seconds. The extruded strand was cooled rapidly in a water bath and pelletized using a pelletizer.

Pellets obtained using the production method described above were dried for 5 hours at 120° C., after which an ISO dumbbell test piece having a thickness of 4 mm and a planar molded article having a length of 100 mm, a width of 100 mm and a thickness of 2 mm were molded using a NEX80 injection molding machine from Nissei Plastic Industrial Company, at a cylinder temperature of 300° C., a mold temperature of 100° C., an injection speed of 100 mm/s and a holding pressure of 80 MPa.

[Measurement of Flexural Modulus of Elasticity]

Flexural modulus of elasticity (units: MPa) was measured in accordance with ISO 178 using the obtained ISO dumbbell test piece (thickness 4 mm).

[Measurement of Charpy Impact Strength (Notched)]

Notched Charpy impact strength (units: $kJ/m^2$) was measured in accordance with ISO 179 using the obtained ISO dumbbell test piece (thickness 4 mm).

The Charpy impact strength is preferably 6 $kJ/m^2$ or more, and more preferably 6.5 $kJ/m^2$ or more.

[Measurement of Coefficient of Linear Expansion]

Test pieces were obtained by cutting the central part of the obtained planar molded article to a length of 15 mm, a width of 10 mm, respectively in the MD/TD direction and a thickness of 2 mm, and these test pieces were used to measure the coefficient of linear expansion.

Using a TMA/SS6100 from Hitachi High-Tech Science Corporation as the measurement equipment, the long part of the test piece was used as the measurement target, the temperature was increased from −30° C. to +120° C. at a rate of 20° C./min, and the coefficient of linear expansion (units: /K) was calculated from the gradient of the amount of dimensional change relative to the degree of temperature change.

[Evaluation of Anisotropy]

The ratio (MD/TD) of coefficient of linear expansion in the machine direction and transverse direction, as calculated above, was calculated.

Pellets obtained using the production method described above were dried for 5 hours at 120° C., after which a disk-like molded article having a diameter of 100 mm and a thickness of 1 mm was molded using an EC160NII injection molding machine from Toshiba Machine Company at a cylinder temperature of 340° C., a mold temperature of 120° C., an injection speed of 100 mm/s and a holding pressure of 70 MPa.

[Evaluation of Warping]

The obtained disk-like molded article was disposed on a flat metal plate in such a way that the central part of the molded article was in contact with the metal plate, and the height of the end of the molded article was measured using a VR-3000 3D shape measuring machine available from Keyence Corporation. In addition, warpage amount was calculated using the formula below.

Warpage amount (mm)=height (mm) of end of molded article−thickness (mm) of molded article Warping was evaluated by evaluating warpage amount according to the four levels A to D below.

A: warpage amount 1 mm or less
B: warpage amount 1 to 2 mm
C: warpage amount 2 to 4 mm
D: warpage amount 4 mm or more

[Fluidity]

The obtained pellets were dried for 5 hours at 120° C., and then injection molded using a NEX80 injection molding machine available from Nissei Plastic Industrial Company, at a cylinder temperature of 300° C., a mold temperature of 100° C., and an injection pressure of 150 MPa, after which the bar flow length of a bar having a thickness of 2 mm and a width of 20 mm was measured, and the average value (units: mm) of 10 shots was determined.

The evaluation results above are shown in Tables 2 to 5.

TABLE 2

|  |  | Examples | | | | |
| --- | --- | --- | --- | --- | --- | --- |
|  |  | 1 | 2 | 3 | 4 | 5 |
| PC resin | A | 100 | 100 | 100 | 100 | 100 |
| AS resin | B | 16.7 | 16.7 | 16.7 | 16.7 | 16.7 |
| Thin GFL | C | 41.7 | 35 | 33.3 | 30 | 25 |
| Ordinary GFL | CX | — | — | — | — | — |
| Elliptic CS | D | 8.3 | 15 | 16.7 | 20 | 25 |
| Round CS | DX | — | — | — | — | — |
| D/C |  | 0.20 | 0.43 | 0.50 | 0.67 | 1.00 |
| C/B |  | 2.5 | 2.1 | 2.0 | 1.8 | 1.5 |
| Flexural modulus of elasticity | MPa | 8400 | 8600 | 8600 | 8700 | 8900 |
| (Notched) Charpy impact strength | kJ/m$^2$ | 6.1 | 7 | 7 | 8 | 10.3 |
| Coefficient of linear expansion (MD) | '10$^{-6}$/K | 27 | 27 | 27 | 26 | 23 |
| Coefficient of linear expansion (TD) | '10$^{-6}$/K | 27 | 28 | 28 | 29 | 32 |
| Anisotropy (MD/TD) | — | 1.00 | 0.96 | 0.96 | 0.90 | 0.72 |
| Evaluation of warping | — | A | A | A | A | B |
| Fluidity | mm | 401 | 390 | 386 | 379 | 369 |

TABLE 3

|  |  | Comparative Examples | | | | | | | | | |
| --- | --- | --- | --- | --- | --- | --- | --- | --- | --- | --- | --- |
|  |  | 1 | 2 | 3 | 4 | 5 | 6 | 7 | 8 | 9 | 10 |
| PC resin | A | 100 | 100 | 100 | 100 | 100 | 100 | 100 | 100 | 100 | 100 |
| AS resin | B | 16.7 | 16.7 | 16.7 | 16.7 | 16.7 | 16.7 | 16.7 | — | 16.7 | 16.7 |
| Thin GFL | C | 50 | — | — | — | 41.7 | 33.3 | 25 | 28.6 | 16.7 | — |
| Ordinary GFL | CX | — | 50 | — | — | — | — | — | — | — | 33.7 |
| Elliptic CS | D | — | — | 50 | — | — | — | — | 14.3 | 33.3 | 16.7 |
| Round CS | DX | — | — | — | 50 | 8.3 | 16.7 | 25 | — | — | — |
| D/C |  | 0 | — | — | — | 0 | 0 | 0 | 0.50 | 1.99 | — |
| C/B |  | 3.0 | — | — | — | 2.5 | 2.0 | 1.5 | — | 1.0 | — |
| Flexural modulus of elasticity | MPa | 8200 | 7500 | 9500 | 9600 | 8400 | 8700 | 8900 | 8100 | 9200 | 8100 |
| (Notched) Charpy impact strength | kJ/m$^2$ | 3.5 | 4.7 | 14 | 14 | 6 | 7 | 9.9 | 8 | 12 | 8 |
| Coefficient of linear expansion (MD) | '10$^{-6}$/K | 27 | 30 | 21 | 21 | 26 | 25 | 23 | 28 | 22 | 30 |
| Coefficient of linear expansion (TD) | '10$^{-6}$/K | 27 | 31 | 41 | 45 | 28 | 31 | 36 | 30 | 37 | 31 |
| Anisotropy (MD/TD) | — | 1.01 | 0.97 | 0.51 | 0.47 | 0.93 | 0.81 | 0.64 | 0.93 | 0.59 | 0.95 |
| Evaluation of warping | — | A | A | D | D | A | B | C | A | C | A |
| Fluidity | mm | 409 | 401 | 340 | 341 | 398 | 388 | 372 | 223 | 355 | 380 |

TABLE 4

|  |  | Examples | | | | | | |
| --- | --- | --- | --- | --- | --- | --- | --- | --- |
|  |  | 6 | 7 | 8 | 9 | 10 | 11 | 12 |
| PC resin | A | 100 | 100 | 100 | 100 | 100 | 100 | 100 |
| AS resin | B | 20 | 20 | 20 | 20 | 20 | 20 | 20 |
| Thin GFL | C | 70 | 64 | 60 | 57 | 50 | 45 | 40 |
| Ordinary GFL | CX | — | — | — | — | — | — | — |
| Elliptic CS | D | 10 | 16 | 20 | 23 | 30 | 35 | 40 |
| Round CS | DX | — | — | — | — | — | — | — |
| D/C |  | 0.14 | 0.25 | 0.33 | 0.40 | 0.60 | 0.78 | 1.00 |
| C/B |  | 3.5 | 3.2 | 3.0 | 2.9 | 2.5 | 2.25 | 2.0 |

TABLE 4-continued

|  |  | Examples | | | | | | |
| --- | --- | --- | --- | --- | --- | --- | --- | --- |
|  |  | 6 | 7 | 8 | 9 | 10 | 11 | 12 |
| Flexural modulus of elasticity | MPa | 11200 | 11300 | 11400 | 11400 | 11500 | 11600 | 11700 |
| (Notched) Charpy impact strength | kJ/m$^2$ | 3.8 | 4.2 | 4.6 | 5.5 | 7 | 8 | 9 |
| Coefficient of linear expansion (MD) | '10$^{-6}$/K | 23 | 23 | 23 | 23 | 22 | 22 | 21 |
| Coefficient of linear expansion (TD) | '10$^{-6}$/K | 22 | 22 | 23 | 23 | 23 | 25 | 27 |
| Anisotropy (MD/TD) | — | 1.05 | 1.05 | 1.00 | 1.00 | 0.96 | 0.88 | 0.78 |
| Evaluation of warping | — | A | A | A | A | A | B | B |
| Fluidity | mm | 369 | 363 | 359 | 356 | 352 | 348 | 345 |

TABLE 5

|  |  | Comparative Examples | | | | | |
| --- | --- | --- | --- | --- | --- | --- | --- |
|  |  | 11 | 12 | 13 | 14 | 15 | 16 |
| PC resin | A | 100 | 100 | 100 | 100 | 100 | 100 |
| AS resin | B | 20 | 20 | 20 | 20 | 20 | 20 |
| Thin GFL | C | 80 | — | — | — | 70 | 60 |
| Ordinary GFL | CX | — | 80 | — | — | — | — |
| Elliptic CS | D | — | — | 80 | — | — | — |
| Round CS | DX | — | — | — | 80 | 10 | 20 |
| D/C | — | 0 | — | — | — | 0 | 0 |
| C/B | — | 4.0 | 0 | 0 | 0 | 3.5 | 3.0 |
| Flexural modulus of elasticity | MPa | 11100 | 10100 | 12200 | 12300 | 11200 | 11500 |
| (Notched) Charpy impact strength | kJ/m$^2$ | 2.9 | 3.6 | 15 | 16 | 4 | 4.7 |
| Coefficient of linear expansion (MD) | '10$^{-6}$/K | 23 | 26 | 19 | 19 | 23 | 23 |
| Coefficient of linear expansion (TD) | '10$^{-6}$/K | 22 | 25 | 40 | 45 | 23 | 24 |
| Anisotropy (MD/TD) | — | 1.05 | 1.04 | 0.48 | 0.42 | 1.00 | 0.96 |
| Evaluation of warping | — | A | A | D | D | A | A |
| Fluidity | mm | 380 | 373 | 316 | 317 | 370 | 360 |

|  |  | Comparative Examples | | | | |
| --- | --- | --- | --- | --- | --- | --- |
|  |  | 17 | 18 | 19 | 20 | 21 |
| PC resin | A | 100 | 100 | 100 | 100 | 100 |
| AS resin | B | 20 | 20 | — | 20 | 20 |
| Thin GFL | C | 50 | 40 | 41.7 | 30 | — |
| Ordinary GFL | CX | — | — | — | — | 50 |
| Elliptic CS | D | — | — | 25 | 50 | 30 |
| Round CS | DX | 30 | 40 | — | — | — |
| D/C | — | 0 | 0 | 0.60 | 1.67 | — |
| C/B | — | 2.5 | 2.0 | — | 1.5 | 0 |
| Flexural modulus of elasticity | MPa | 11600 | 11800 | 11200 | 11800 | 10800 |
| (Notched) Charpy impact strength | kJ/m$^2$ | 7 | 9 | 9 | 11 | 7 |
| Coefficient of linear expansion (MD) | '10$^{-6}$/K | 22 | 21 | 24 | 21 | 26 |
| Coefficient of linear expansion (TD) | '10$^{-6}$/K | 26 | 32 | 25 | 34 | 26 |
| Anisotropy (MD/TD) | — | 0.85 | 0.66 | 0.96 | 0.62 | 1.00 |
| Evaluation of warping | — | B | C | A | C | A |
| Fluidity | mm | 353 | 346 | 207 | 330 | 353 |

INDUSTRIAL APPLICABILITY

The polycarbonate resin composition of the present invention is excellent in terms of strength, dimensional stability and low anisotropy, has a similar coefficient of linear expansion to that of a metal such as aluminum or magnesium, and further exhibits excellent fluidity, and can therefore be advantageously used in lens barrels and a variety of other applications, and is highly industrially applicable.

The invention claimed is:

1. A polycarbonate resin composition, comprising, relative to 100 parts by mass of a polycarbonate resin (A):
   10 to 100 parts by mass of an acrylonitrile-styrenic copolymer (B);
   10 to 100 parts by mass of glass flakes (C) having an average thickness in a range of from 0.45 to 1 µm; and
   5 to 50 parts by mass of glass fibers (D) having an elliptical cross section with an ellipticity in a range of from more than 1.5 to not more than 8,
   wherein a (D)/(C) mass ratio of the glass fibers (D) to the glass flakes (C) is in a range of from 0.1 to 1,
   wherein a (C)/(B) mass ratio of the glass flakes (C) to the acrylonitrile-styrenic copolymer (B) is in a range of from 2.0 to 3.5, and
   wherein a ratio of a coefficient of linear expansion in MD to a coefficient of linear expansion in TD is in a range of from 0.92 to 1.1.

2. The composition of claim 1, wherein the glass flakes (C) are present in a range of from more than 30 parts by mass to not more than 100 parts by mass, relative to 100 parts by mass of the polycarbonate resin (A).

3. The composition of claim 1, wherein the glass fibers (D) are present in a range of from more than 15 parts by mass to not more than 50 parts by mass, relative to 100 parts by mass of the polycarbonate resin (A).

4. The composition of claim 1, comprising not more than 1 part by mass of phosphorus flame retardant, relative to 100 parts by mass of the polycarbonate resin (A), and
   not more than 1 part by mass of fluororesin having fibril-forming ability, relative to 100 parts by mass of the polycarbonate resin (A).

5. A molded article, comprising the composition of claim 1.

6. The article of claim 5, selected from the group consisting of a camera housing component, a camera lens barrel, a telescope housing component, a telescope lens barrel, a microscope housing component, a microscope lens barrel, a projection exposure device housing component, a projection exposure device lens barrel, an optical measurement device housing component, an optical measurement device lens barrel, a smartphone camera housing component, a smartphone camera mechanism component, a vehicle camera housing component, a vehicle camera mechanism component, a drive recorder housing component, a drive recorder mechanism component, a surveillance camera housing component, a surveillance camera mechanism component, a drone-mounted camera housing component, a drone-mounted camera mechanism component, an impact prevention sensor housing, an impact prevention sensor mechanism component, a rear monitor sensor housing, a rear monitor sensor mechanism, a vehicle speed sensor housing, a vehicle speed sensor mechanism component, a temperature sensor housing, a temperature sensor mechanism component, a vehicle crime prevention sensor housing, a vehicle crime prevention sensor mechanism component, a motor vehicle frame member, a motor vehicle external panel member, a motorcycle frame member, a motorcycle external panel member, a bicycle frame member, a bicycle external panel member, a wheelchair frame member, a wheelchair external panel member, a home television panel member, a home television mechanism component, a computer display panel member, a computer display mechanism component, a vehicle monitor panel member, a vehicle monitor mechanism component, a smartphone panel member, a smartphone mechanism component, a head-mounted display panel member, a head-mounted display mechanism component, a bar code reader housing, a bar code reader mechanism component, a scanner housing, and a scanner mechanism component.

7. The article of claim 6, selected from the group consisting of a camera housing component, a camera lens barrel, a telescope housing component, telescope lens barrel, a microscope housing component, microscope lens barrel, a projection exposure device housing component, projection exposure device lens barrel, an optical measurement device housing component, optical measurement device lens barrel, a smartphone camera housing component, a smartphone camera mechanism component, a vehicle camera housing component, a vehicle camera mechanism component, a drive recorder housing component, a drive recorder mechanism component, a surveillance camera housing component, a surveillance camera mechanism component, a drone-mounted small camera housing component, a drone-mounted small camera mechanism component, a home television panel member, a home television mechanism component, a computer display panel member, a computer display mechanism component, a vehicle monitor panel member, a vehicle monitor mechanism component, a smartphone panel member, a smartphone mechanism component, a head-mounted display panel member, and a head-mounted display mechanism component.

8. The composition of claim 1, wherein the (C)/(B) mass ratio is in a range of from 2.0 to 3.2.

9. The composition of claim 1, wherein the ratio of the coefficients of linear expansion is in a range of from 0.94 to 1.1.

10. The composition of claim 1, wherein the ratio of the coefficients of linear expansion is in a range of from 0.92 to 1.08.

11. The composition of claim 1, further comprising:
    a polycarbonate oligomer having a viscosity average molecular weight (Mv) in a range of from 1500 to 9500.

12. The composition of claim 1, wherein the polycarbonate resin (A) has a viscosity average molecular weight (Mv) in a range of from 16,000 to 50,000.

13. A polycarbonate resin composition, comprising, relative to 100 parts by mass of a polycarbonate resin (A):
    not more than 1 part by mass of phosphorus flame retardant;
    not more than 1 part by mass of fluororesin having fibril-forming ability;
    10 to 100 parts by mass of an acrylonitrile-styrenic copolymer (B);
    10 to 100 parts by mass of glass flakes (C) having an average thickness in a range of from 0.45 to 1 µm; and
    5 to 50 parts by mass of glass fibers (D) having an elliptical cross section with an ellipticity in a range of from more than 1.5 to not more than 8,
    wherein a (D)/(C) mass ratio of the glass fibers (D) to the glass flakes (C) is in a range of from 0.1 to 1,
    wherein a (C)/(B) mass ratio of the glass flakes (C) to the acrylonitrile-styrenic copolymer (B) is in a range of from 2.0 to less than 4.0, and wherein a ratio of a coefficient of linear expansion in MD to a coefficient of linear expansion in TD is in a range of from 0.92 to 1.1.

14. The composition of claim 13, comprising:
no phosphorus flame retardant; and
not more than 1 part by mass of fluororesin having fibril-forming ability, relative to 100 parts by mass of the polycarbonate resin (A).

15. The composition of claim 13, comprising:
not more than 1 part by mass of phosphorus flame retardant, relative to 100 parts by mass of the polycarbonate resin (A); and
no fluororesin having fibril-forming ability.

16. The composition of claim 13, comprising:
no phosphorus flame retardant; and
no fluororesin having fibril-forming ability.

17. The composition of claim 13, wherein the (C)/(B) mass ratio is in a range of from 2.0 to 3.5.

18. The composition of claim 13, wherein the ratio of the coefficients of linear expansion is in a range of from 0.94 to 1.1.

19. The composition of claim 13, wherein the ratio of the coefficients of linear expansion is in a range of from 0.92 to 1.08.

20. The composition of claim 13, wherein the ratio of the coefficients of linear expansion is in a range of from 0.92 to 1.06.

* * * * *